(12) United States Patent
Frayne

(10) Patent No.: US 7,986,051 B2
(45) Date of Patent: Jul. 26, 2011

(54) ENERGY CONVERTERS UTILIZING FLUID-INDUCED OSCILLATIONS

(75) Inventor: Shawn Michael Frayne, Mountain View, CA (US)

(73) Assignee: Humdinger Wind Enery LLC, Honolulu ( * ) Notice: Subject to any disclaimer, the term of this patent is extended or adjusted under 35 U.S.C. 154(b) by 721 days.

(21) Appl. No.: 11/849,988

(22) Filed: Sep. 4, 2007

(65) Prior Publication Data

US 2009/0295163 A1    Dec. 3, 2009

Related U.S. Application Data

(60) Provisional application No. 60/932,304, filed on May 30, 2007, provisional application No. 60/950,227, filed on Jul. 17, 2007.

(51) Int. Cl.
*H02K 35/02* (2006.01)
(52) U.S. Cl. .................................................... 290/1 E
(58) Field of Classification Search .................... 290/1 E
See application file for complete search history.

(56) References Cited

U.S. PATENT DOCUMENTS

| | | | |
|---|---|---|---|
| 3,686,520 A | 8/1972 | Campagnuolo | |
| 3,772,541 A * | 11/1973 | Campagnuolo et al. | 470/141 |
| 3,798,475 A | 3/1974 | Campagnuolo | |
| 4,024,409 A | 5/1977 | Payne | |
| 4,184,805 A | 1/1980 | Arnold | |
| 4,348,594 A | 9/1982 | Lipfert | |
| 4,396,852 A | 8/1983 | Hunt | |
| 4,536,674 A | 8/1985 | Schmidt et al. | |
| 5,223,763 A | 6/1993 | Chang | |
| 5,395,592 A | 3/1995 | Bolleman et al. | |
| 5,621,264 A | 4/1997 | Epstein et al. | |
| 5,839,508 A * | 11/1998 | Tubel et al. | 166/65.1 |
| 5,955,790 A | 9/1999 | North | |
| 6,011,346 A | 1/2000 | Buchanan et al. | |
| 6,020,653 A | 2/2000 | Woodbridge et al. | |
| 6,153,944 A | 11/2000 | Clark | |
| 6,273,680 B1 | 8/2001 | Arnold | |

(Continued)

FOREIGN PATENT DOCUMENTS

DE    A-0 977 345    2/2000

(Continued)

OTHER PUBLICATIONS

Computer translation of JP 2001157433A of Jun. 2001 to Hiyane.*

(Continued)

*Primary Examiner* — Joseph Waks
(74) *Attorney, Agent, or Firm* — Jeffrey Schox

(57) ABSTRACT

An energy converter for inducing membrane vibrations when subject to a fluid flow and converting the kinetic energy embedded in the fluid flow into another form of energy, such as electricity. The energy converter includes a supporting structure and multiple generator units. Each generator unit includes at least one flexible membrane, and at least one electrical conductor and at least one magnetic field generator configured to apply a magnetic field to the at least one electrical conductor, wherein one of the electrical conductor and the magnetic field generator is attached to the membrane and configured to move with the membrane. Each membrane vibrates when subject to the fluid flow and has at least two ends supported by the supporting structure. The vibration of each membrane creates a relative movement between the conductor and a magnetic field generated by the magnetic field generator, which induces a current. A power conditioning circuit is provided to condition the current.

29 Claims, 11 Drawing Sheets

U.S. PATENT DOCUMENTS

| | | | |
|---|---|---|---|
| 6,424,079 | B1 | 7/2002 | Carroll |
| 6,768,214 | B2 | 7/2004 | Schultz et al. |
| 6,791,205 | B2 | 9/2004 | Woodbridge |
| 6,849,963 | B2 | 2/2005 | Grinsted et al. |
| 6,864,592 | B1 | 3/2005 | Kelly |
| 7,012,340 | B2 | 3/2006 | Yi |
| 7,023,104 | B2 | 4/2006 | Kobashikawa et al. |
| 7,148,591 | B2 * | 12/2006 | Mizoguchi et al. ............ 310/36 |
| 7,199,480 | B2 * | 4/2007 | Fripp et al. .................. 290/1 R |
| 7,208,845 | B2 * | 4/2007 | Masters et al. ............... 290/1 R |
| 7,224,077 | B2 * | 5/2007 | Allen ........................... 290/1 R |
| 7,414,325 | B2 | 8/2008 | Pinkerton |
| 7,439,630 | B2 | 10/2008 | Peacock |
| 7,498,681 | B1 * | 3/2009 | Kellogg et al. ............... 290/1 R |
| 7,573,143 | B2 * | 8/2009 | Frayne .......................... 290/1 R |
| 2004/2051692 | | 12/2004 | Machida |
| 2005/0051323 | A1 | 3/2005 | Fripp et al. |
| 2005/0093302 | A1 * | 5/2005 | Miyazaki et al. ............. 290/1 R |
| 2005/0099010 | A1 | 5/2005 | Hirsch |
| 2005/0230974 | A1 | 10/2005 | Masters et al. |
| 2006/0016606 | A1 | 1/2006 | Tubel et al. |
| 2006/0064972 | A1 | 3/2006 | Allen |
| 2006/0175838 | A1 | 8/2006 | Tips |
| 2008/0129254 | A1 * | 6/2008 | Frayne .............................. 322/3 |
| 2009/0295163 | A1 | 12/2009 | Frayne |

FOREIGN PATENT DOCUMENTS

| | | |
|---|---|---|
| DE | 102 41 854 | 4/2003 |
| DE | 10241854 | 4/2003 |
| EP | 0977 345 | 2/2000 |
| JP | 2001157433 | 6/2001 |
| JP | 2001157433 A * | 6/2001 |
| JP | 2006-291842 | 10/2006 |
| RU | 1798866 | 2/1993 |
| RU | 1798866 A1 * | 2/1993 |
| WO | WO 03/001657 | 1/2003 |
| WO | WO2008151008 | 12/2008 |
| WO | WO 2008151008 A1 * | 12/2008 |

OTHER PUBLICATIONS

Jones, et al. Oscillating-Wing Power Generation. 3rd ASME/JSME Joint Fluids Engineering Conference. 1999;1-6.
McKinney, et al. The Wingmill: An Oscillating-Wing Windmill. J. Energy. 1981;5(2): 109-115.
Shahrzad, et al. Limit Cycle Flutter of Airfoils in Steady and Unsteady Flows. Journal of Sound and Vibration. 2002;256(2):213-225.
Sharp, P. Proposed Fluttermill Semi-Random Flutter. 2007.
Sharp, P. Proposed Fluttermill. Ganged Blades. 2007.
Sharp, P. The Fluttermill. Jun. 2007;1-6.
Shimizu, et al. Multiobjective Design Study of a Flapping Wing Power Generator. Journal of Fluids Engineering. Feb. 2008;(130): 021104-1-021104-8.
Frayne. U.S. Appl. No. 11/849,997, entitled "Fluid Induced Energy Converter With Curved Parts," filed Sep. 4, 2007.
J. Energy, McKinney, et.al, The Wingmill: An Oscillating-Wing Windmill, 5(2) p. 109-115, 1981.
3rd ASME/JSME Joint Fluids Engineering Conference, Jones, et.al Oscillating-Wing Power Generation, p. 1-6, 1999.
Journal of Sound and Vibration, Shahrzad, et.al, Limit Cycle Flutter of Airfoils in Steady and Unsteady Flows, 256(2): 213-225, 2002.
Sharp, P., Proposed Fluttermill Semi-Random Flutter, 2007.
Sharp, P., Proposed Fluttermill. Ganged, 2007.
Journal of Micromechanics and Microengineering, Institute of Physics Publishing, Makoto Mizuno et.al, Investigation of a resonance microgenerator, vol. 13, No. 2, pp. 209-216, Mar. 2003, Bristol, GB.
Sharp, P., The Flutter Mill, p. 1-6, Jun. 2007.
Journal of Fluids Engineering, Shimizu, et.al, Multiobjective Design Study of a Flapping Wing Power Generator, (130): 021104-1-021104-8, Feb. 2008.
Search Report, PCT of Sep. 5, 2007.
Makoto Mizuno and Derek G. Chetwynd, "Investigation of a Resonance Microgenerator", Journal of Micromechancis & Microengineering, Institute of Physics Publishing, Bristol, GB, vol. 13, No. 2, Mar. 1, 2003, pp. 209-216.

* cited by examiner

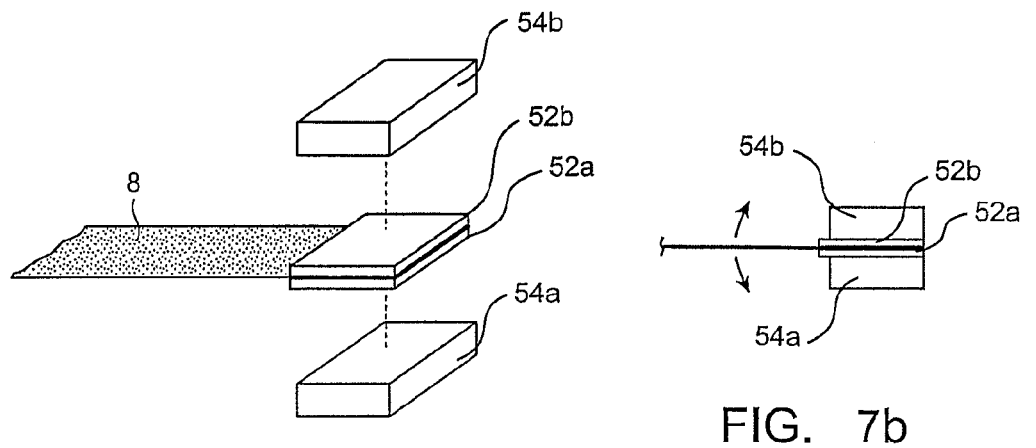
FIG. 7a
FIG. 7b
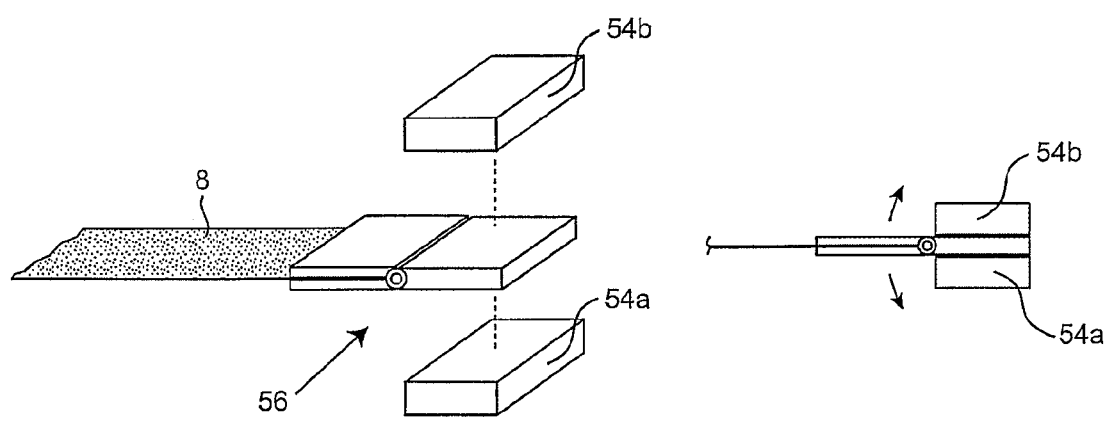
FIG. 8a
FIG. 8b

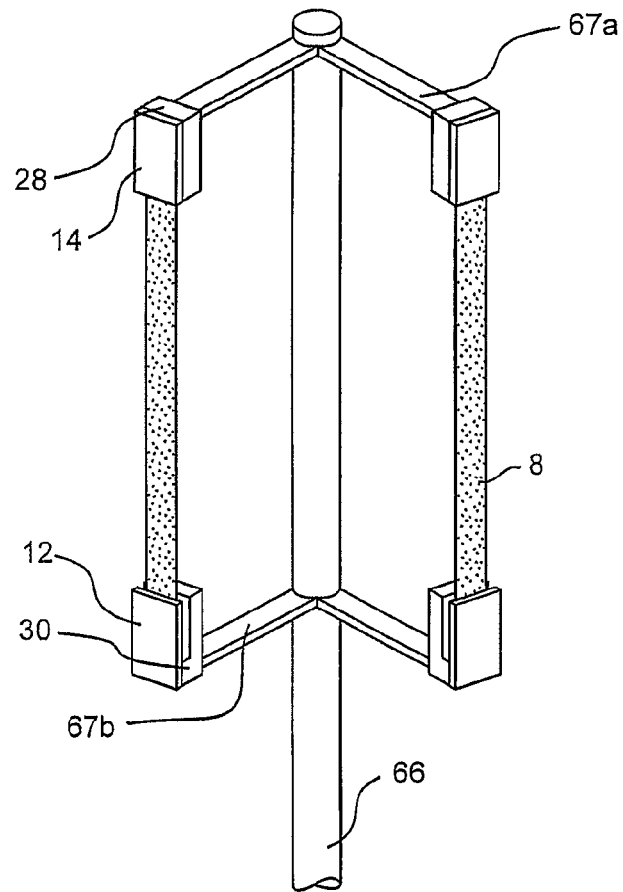
FIG. 13a
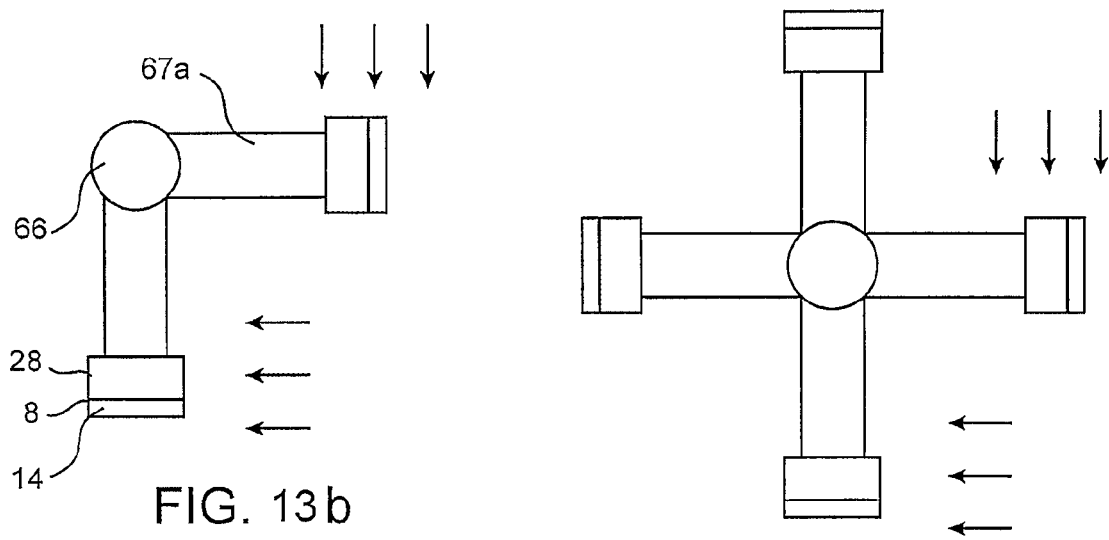
FIG. 13b
FIG. 13c

ENERGY CONVERTERS UTILIZING FLUID-INDUCED OSCILLATIONS

RELATED APPLICATIONS

This application relates to co-pending U.S. patent application Ser. No. 11/566,127, filed Dec. 1, 2006 and titled "GENERATOR UTILIZING FLUID-INDUCED OSCILLATIONS," and to U.S. patent application Ser. No. 11/849,997, entitled "FLUID-INDUCED ENERGY CONVERTER WITH CURVED PARTS," and filed Sep. 4, 2007; and claims the benefits of priority from U.S. Provisional Patent Application No. 60/932,304, filed May 30, 2007, entitled "GENERATOR UTILIZING FLUID-INDUCED OSCILLATIONS," and from U.S. Provisional Patent Application No. 60/950,227, filed Jul. 17, 2007 and entitled "GENERATOR AND CIRCUIT UTILIZING FLUID-INDUCED OSCILLATIONS," the disclosures of which are incorporated herein by reference in their entireties.

FIELD OF DISCLOSURE

This application generally relates to techniques of harvesting energy from flowing fluids, such as air, water, etc., and more specifically, to designs and structures of energy converters that convert kinetic energies embedded in the flowing fluids to other types of energy, such as electricity, by promoting and utilizing oscillations induced by flowing fluids.

BACKGROUND AND SUMMARY

This disclosure describes various embodiments of novel energy converters, such as electrical generators, that effectively promote oscillations induced by flowing fluids, and utilize the oscillations in generating electricity or other types of energy by converting energy present in fluid flows, such as airflows, water flows, tides, etc. In one aspect, an exemplary generator harnesses the kinetic energy of fluid flows by way of aeroelastic flutter induced along a tensioned membrane fixed at two or more points.

An exemplary energy converter includes a supporting structure, at least one magnetic field generator, at least one electrical conductor, and at least one flexible membrane. Each flexible membrane has at least two ends supported by the supporting structure, and the membrane vibrates when subject to a fluid flow. As used herein, the term "flexible" refers to a membrane that has the ability to morph into a large variety of determinate and indeterminate shapes in response to the action of an applied force.

The at least one magnetic field generator may be implemented as permanent magnets attached to, and move with, the membrane. For instance, one or more magnets are integrated into or onto either side or both sides of the oscillating membrane. Those magnetic field generators are disposed in proximity to corresponding electrical conductors. The electrical conductors may be implemented as aluminum or copper coils of various geometries. A variation of the arrangement of the magnets and the electrical conductors may be attaching or affixing the electrical coils to the membrane and disposed in proximity to corresponding magnetic field generators.

The flowing fluid induces a spontaneous instability in the tensioned membrane known as aeroelastic flutter, or simply "flutter". The flutter of the membrane results in a high energy oscillation mode, with a reduced torsion oscillation near the magnets nearer the ends of the membrane. Additionally, vortices shedding may occur along the edges and surface of the membrane, in some cases enhancing the oscillation.

The vibration of the membrane induced by the fluid flow causes a relative movement between the at least one electrical conductor and the applied magnetic field. The relative movement causes a change in the strength of the magnetic field applied to the electrical conductor, which induces a current flowing in the conductor.

This electric generator operates at a variety of wind speeds, including lower speeds than required for most turbine-based generators. Moreover, the cost of an exemplary generator of this disclosure is substantially lower than most other fluid flow harvesting generators. The absence of physically grinding parts offers the possibility of long, quiet, maintenance-free operation. No leading bluff bodies are required to initiate or sustain oscillation, although they can be employed if desired.

Additional aspects and advantages of the present disclosure will become readily apparent to those skilled in this art from the following detailed description, wherein only exemplary embodiments of the present disclosure are shown and described, simply by way of illustration of the best mode contemplated for carrying out the present disclosure. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

BRIEF DESCRIPTION OF THE DRAWINGS

FIG. 1b is a side view of the exemplary generator shown in FIG. 1a.

FIG. 7a is a perspective view of an alternative construction of the generator membrane end portion.

FIG. 7b is a sectional side view of the membrane variation of FIG. 7a, depicting the general direction of movement.

FIG. 8a is a perspective view of another alternative construction of the generator membrane incorporating a hinge structure.

FIG. 8b is a sectional side view of the membrane variation of FIG. 8a, depicting the general direction of movement.

FIG. 13a-13c depict variations of the generator illustrated in FIG. 12.

FIG. 14a depicts a variation of the generator illustrated in FIG. 1.

FIG. 14b depicts a back view of the generator illustrated in FIG. 14a.

FIG. 15 depicts a variation of the generator depicted in FIG. 14a.

DETAILED DESCRIPTION OF ILLUSTRATIVE EMBODIMENTS

In the following description, for the purposes of explanation, numerous specific details are set forth in order to provide a thorough understanding of the present disclosure. It will be apparent, however, to one skilled in the art that the present disclosure may be practiced without these specific details. In other instances, well known structures and devices are shown in block diagram form in order to avoid unnecessarily obscuring this disclosure.

Figure 1A:
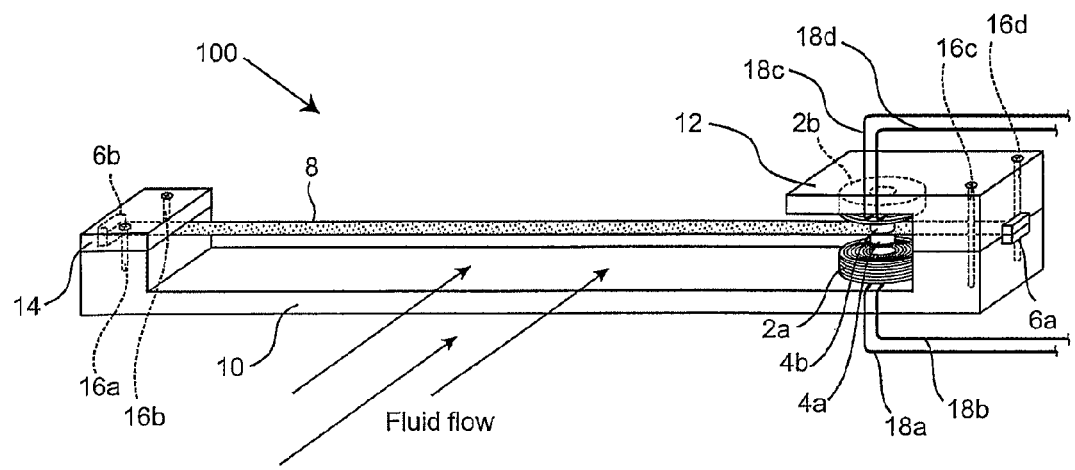
FIG. 1a is a perspective view of an exemplary generator according to this disclosure.

FIG. 1a depicts an exemplary generator 100 according to this disclosure. The generator 100 includes a supporting structure and an elongated membrane 8. The supporting structure comprises a supporting base 10 and two supporting structure clamps 12 and 14.

The membrane 8 is made from a flexible material, such as ripstock nylon, super thin polyester film, mylar-coated taffeta, Kevlar tapes, or polyethylene film, etc. The membrane 8 has two main surfaces on opposite sides and two thin edges. In this disclosure, a surface plane of a membrane is defined as a plane on which one of the main surfaces is disposed. Magnetic field generators, such as permanent magnets 4a, 4b, are affixed to both main surfaces of the membrane 8, respectively. More or less magnets and/or conducting coils may be employed to achieve desired cost and power efficiencies.

Two electrical conducting coils 2a, 2b are attached to the supporting base 10 and supporting clamp 12, and suspended over the magnets 4a, 4b, respectively. The coils may be affixed to the supporting base 10 and/or the clamp 12 at various orientations relative to the magnets 4a, 4b.

Tensioning devices, such as membrane anchors sets 6a, 6b, are provided to maintain tension of the membrane 8 when the membrane 8 is attached to the supporting structure. As shown in FIG. 1a, the anchor sets 6a, 6b are attached near both ends of the membrane 8 at a specific separating distance, for applying a tensioning force to the membrane 8. It is understood that other devices known to people skilled in the art, such as screws, adhesives, clamps, wires, strings, hooks, staples, nails, etc., may be used to implant the tensioning device for applying a tensioning force to the membrane 8. For instance, the membrane 8 may be clamped between the supporting base 10 and supporting structure clamps 6a, 6b, to provide the needed tensioning force.

Leads 18a-18d are coupled to coil 2a and 2b, respectively. The tension force applied to the membrane 8 is a function of the elasticity of the membrane and the physical characteristics of the supporting structure, along with the particular distance between the ends of the supporting structure relative to the distance between the anchor sets 6a and 6b.

The exemplary generator 100 shown in FIG. 1 operates as follows. A flow of fluid include liquid flows traveling across the elongated and tensioned membrane 8. Examples of fluid flows may include flowing water or a flow of air like that found in artificial ventilation systems or in natural wind. The fluid flow travels in a direction ranging from 0 to 180 degrees relative to the major axis of the membrane 8, with perpendicular flow (e.g. 90 degree to the major membrane axis along the surface planes of the membrane 8) giving approximately the most energetic oscillation. Fluid may flow from either side of the generator 100. One example of this fluid flow is indicated by three arrows in FIG. 1. The fluid flow initiates a self-exciting instability (e.g., flutter) in the membrane 8 which is enhanced through a positive feedback loop of competing fluid deflection and membrane tension forces, until an approximately constant oscillation state is achieved. The majority of the membrane 8, such as the middle section, undergoes a combination of moderate torsional (e.g., slight back-and-forth rotation along the major axis of the membrane 8) and "rising and falling" travel (the profile of the "rising and falling" travel of the membrane 8 is depicted in FIG. 1c), which is recognizable as a "flutter" oscillation. The generator 100 translates the torsional and "rising and falling" movements of the membrane 8 into a reduced torsion oscillation at the location of the magnets 4a, 4b on the membrane 8. A more highly torsional, less linear oscillation of the magnets 4a, 4b is achievable utilizing the same construction of generator 100, requiring only a slight alteration to the tensioning of the membrane 8 and placement of the magnets 4a, 4b. In one embodiment, the magnets may be compelled into a slight arched, reduced torsion (relative to the major axis of the membrane) oscillation via the flutter effect of the membrane 8.

Figure 1B:
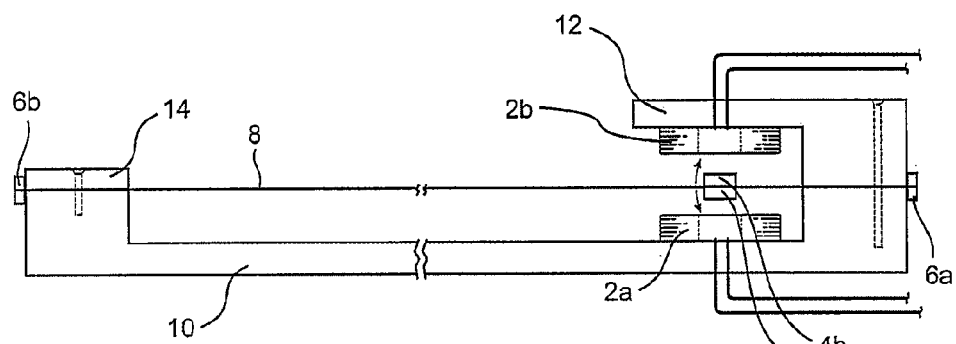
Figure 1C:
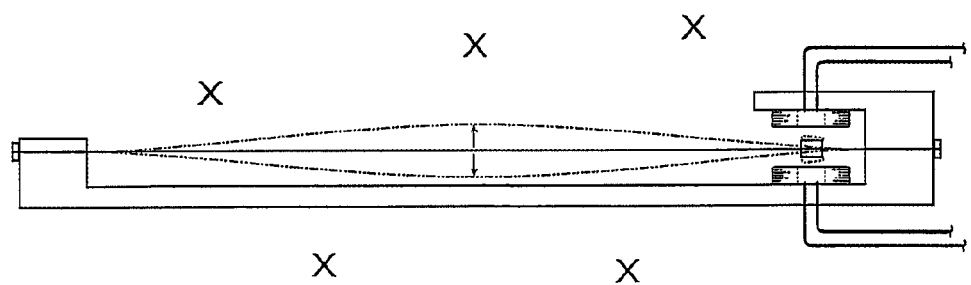
FIG. 1c is a side view of the exemplary generator shown with examples of airflow and membrane oscillation profile.

FIGS. 1b and 1c depict an oscillation where the magnets 4a, 4b and the end of the membrane 8 on which the magnets are placed move in a reduced torsion, slightly arched path, with small arrows indicating the movement of the magnets 4a, 4b on the membrane 8. This reduced torsion oscillation of the magnets 4a, 4b creates a changing magnetic field through the closed area of the coils 2a, 2b, with the magnetic fields oriented such that an electromotive force (EMF) is established in the conductive material of the coils 4a, 4b. The EMF creates a current, i.e., a flow of electrons, dependent on the load conditions, internal resistance, impedance, and a range of other factors. As applies to electrical generators of any sort, this fundamental arrangement of a changing magnetic field relative to a coil of electrical conductive material follows the physical rules originally described by Michael Faraday. The generator 100 has significant advantages over conventional generators in that no sliding contacts, gears, axles or physically grinding parts are required to generate an electrical flow.

In the oscillation mode shown in FIG. 1b, the magnets 4a, 4b oscillate approximately in phase with each other. The electricity flowing through respective leads 18a-d may therefore be combined without significant destructive interference. The leads 18a-d may be joined in parallel or series, depending on the desired voltages and currents fed into a power conditioning circuit associated with the generator 100.

The configuration shown in FIG. 1a, and further clarified in FIG. 1b, is designed to move a substantial mass (e.g., the magnets) at high frequency, with some displacement. At its most fundamental level, the generator 100 can be modeled as a simple machine that achieves a mechanical advantage in a manner akin to the way in which a lever converts a large translated motion with little force into a smaller motion with a greater potential force. This greater force near the ends of the membrane 8 allows for the high frequency oscillation of the substantial mass of the magnets 4a, 4b, even in low speed fluid flows. By achieving higher frequency oscillation, less magnetic field generating material (e.g., smaller magnets) could be used to achieve efficient conversion of the kinetic energy of the fluid flow into electricity, which translates into less expensive generators. Additionally, by placing the magnets 4a, 4b largely out of the path of the flowing fluid, the majority of the mid-section of the membrane can respond to those flows without impediment.

As shown in FIGS. 1a and 2a, the membrane 8 is disposed between the clamps 12, 14 and the supporting base 10. The clamps 12 and 14 may be fixed to the supporting base 10 by any affixing means, such as by adhesive or mechanical fasteners like bolts with nuts or screws, as well as via many other well-understood options. In FIGS. 1a and 2a, screws 16a-d are fed into tapped holes in the supporting base 10. Other fastening devices, such as a thread-less through-hole extending the entire thickness of the structure 10, could be employed, with corresponding bolts and nuts applied.

The anchor sets 6a, 6b are affixed to the membrane 8 through any kinds of affixing means. In one embodiment, the anchor sets 6a, 6b are adhered to the membrane 8 with adhesive. These anchor sets 6a, 6b are separated by a pre-defined distance. This pre-defined distance relative to the overall length of the supporting base 10 establishes a particular tension of the membrane 8.

While the example illustrated in FIG. 1a utilizes a structure in which coils 2a, 2b are disposed above the two surface lanes of the membrane 8, a variation of the embodiment may dispose the coils 2a, 2b in the proximity of the magnets, such as laterally alongside the magnets 4a, 4b, along the edges of the membrane 8. In this case, diametrically-magnetized magnets or appropriately shaped axially-magnetized magnets may be employed. The magnetic fields would project more significantly in the lateral direction, cutting across the coils disposed by the edges of the membrane 8, as the magnet oscillates. This structure is advantageous in that side-mounted coils would not impede the greater membrane displacement that may intermittently occur. More than one set of coils may be side-mounted to take advantage of increased displacement of the membrane-mounted magnets in more powerful fluid flows. For large generators or generators subjected to highly variable fluid flow, one or more axially-magnetized magnets of various geometries can be combined with one or more side-mounted coils. The side-mounted coils may employ air cores and/or ferromagnetic cores, so as to make more efficient use of the flux projected by the magnets. Also, various coil windings can be employed (e.g., wave winding).

Figure 2:
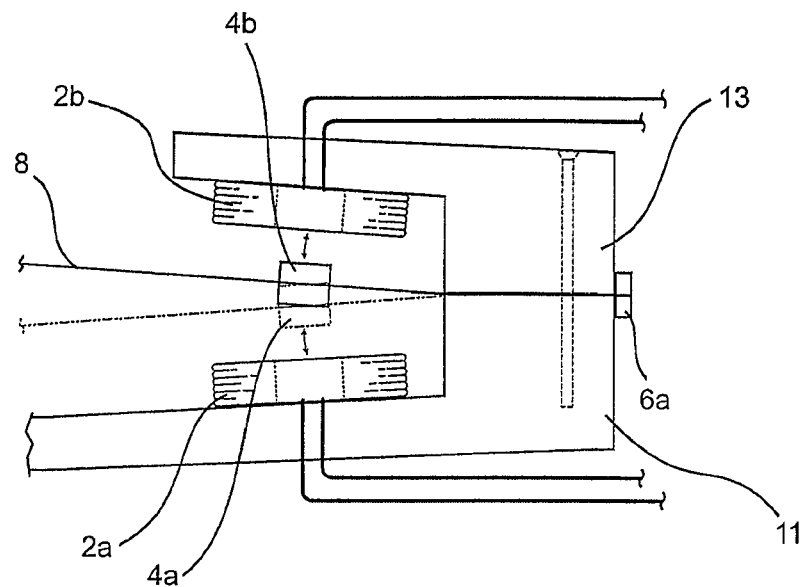
FIG. 2 is a side view of a variation of the coil and mounting structure of an exemplary generator.

FIG. 2 depicts a sectional side view of a variation of the generator illustrated in FIG. 1a. A supporting structure including a supporting clamp 13 and a supporting base 11 is provided. The supporting clamp 13 and the supporting base 11 are angled slightly, to better position the coils 2a, 2b to more efficiently capture the slight arched travel path of the magnets 4a, 4b. This same effect may be achieved by "shimming" a side of each of the coils 2a, 2b in the generator depicted in FIG. 1a.

Figure 3:
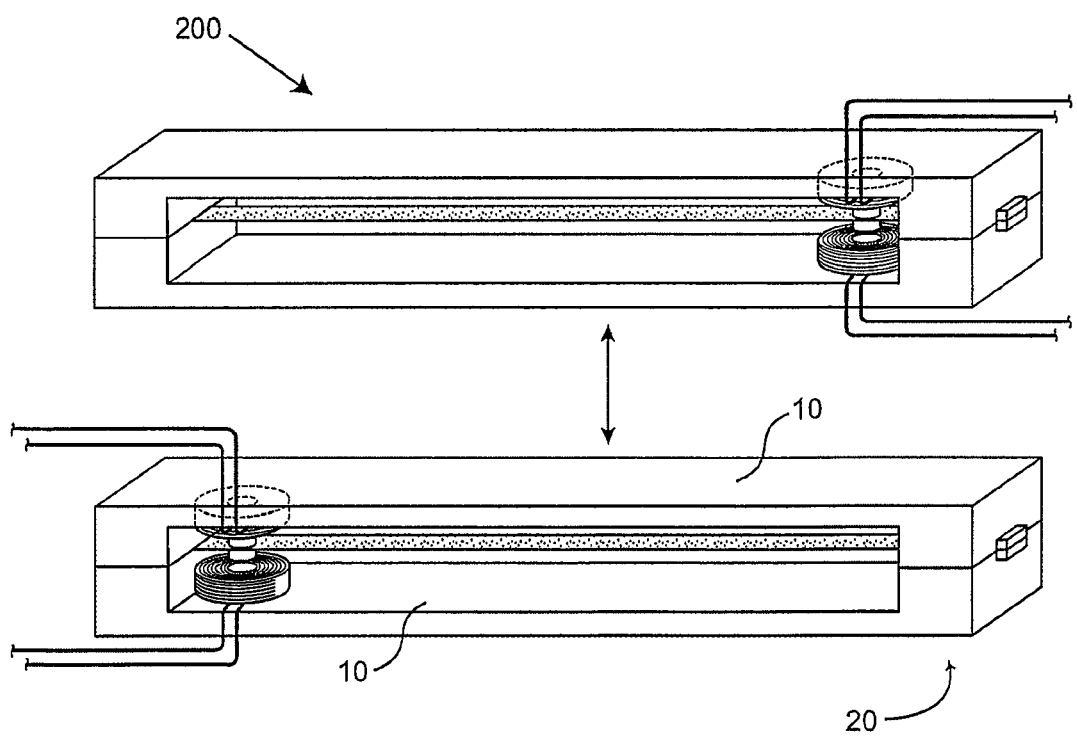
FIG. 3 is a perspective view depicting a plurality of stackable generator units.

FIG. 3 depicts a perspective view of another exemplary generator 200. Unlike the generator 100 shown in FIG. 1a which uses separate clamping means to connect the membrane 8 to the supporting structure, the generator 200 utilizes two approximately identical supporting structures 10 affixed to one another, thereby capturing the membrane 8 between the anchor sets 6a, 6b. The supporting structures 10 are attached to one another through an adhesive. It is understood that other types of fastening devices, such as mechanical fasteners, can be employed. This construction provides multiple advantages: ease of manufacture (e.g., fewer different components to manufacture), straightforward generator "stacking" (as indicated in FIG. 3), and in some cases the concentrated and directional channeling of fluid flow through a wide conduit, yielding enhanced oscillation.

Figure 4:
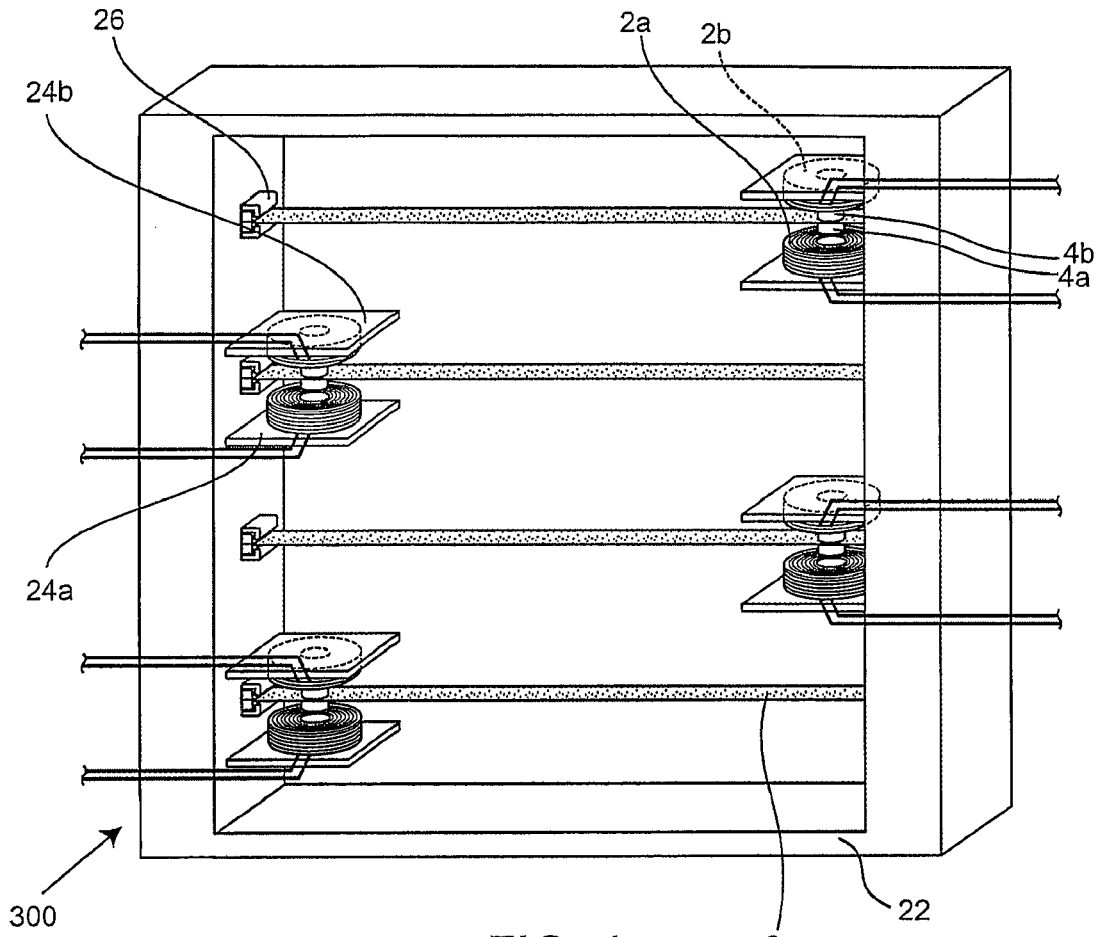
FIG. 4 is a perspective view depicting a frame-like mounting structure tensioning a plurality of exemplary generator units.

FIG. 4 depicts a perspective view of an exemplary generator 300 including a frame-like supporting structure and multiple generator units implemented according to the concepts illustrated in this disclosure. Each generator unit includes at least one membrane, at least one coil, and at least one magnet for applying a magnetic field to the at least one coil. One of the magnet and the coil is attached to the membrane and moves with the membrane. The surface plane of each membrane may be parallel or non-parallel to the surface plane of another membrane. The vibration of each membrane caused by the fluid flow creates a relative movement between the at least one coil and the magnetic field generated by the at least one magnet. The relative movement creates a change in the strength of the magnetic field applied to the coil, which induces a current. A power conditioning circuit is provided to condition the current generated by each generator unit.

If generator units of the types illustrated in FIGS. 1a and 2 are used, the anchor sets 6a, 6b (not pictured) may slide into anchor conduits 26 disposed on opposing inner walls (not pictured for clarity) of the frame 22. The anchor conduits 26 and anchor sets 6a, 6b apply a pre-defined tension to the membranes and hold the membranes in place. The generator 300 allows a plurality of generator units to be incorporated into the same structure. Additionally, the generator 300 may be incorporated into architectural structures, such as window-frames of buildings or spans between standing structures. For example, the frame-like supporting structure may be implemented using window-frames, and anchor conduits can be separately applied to that frame. Other types of affixing means, such as slots in the supporting frame 22, can be used in place of anchor conduits. In this way, a simple cutting and bending process, or injection molding or extrusion process, can be used to economically create the entire supporting structure.

Figure 5:
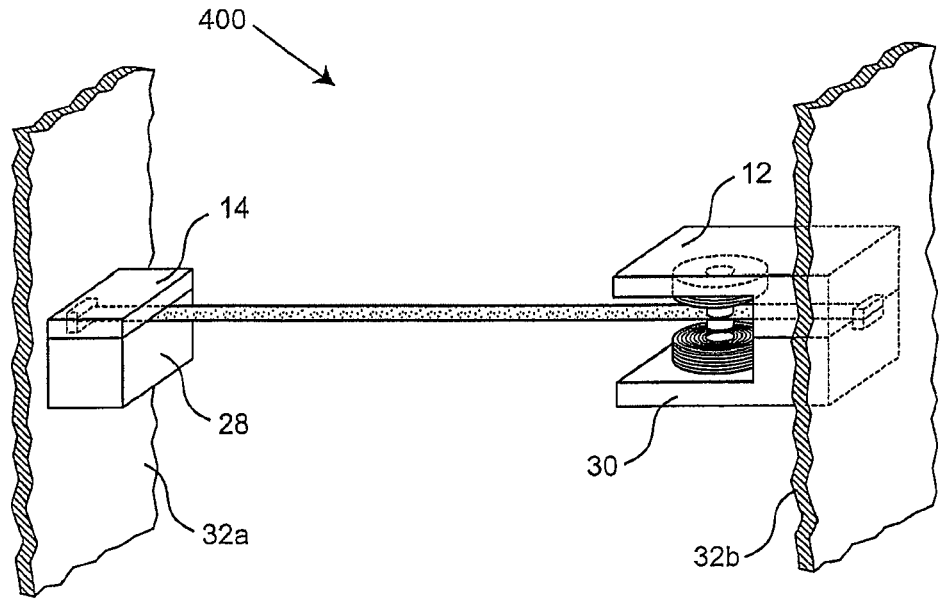
FIG. 5 is a perspective view of another embodiment of an exemplary generator.

FIG. 5 is a perspective view of another exemplary generator unit 400, which is a variation of that alluded to in FIG. 4. The supporting structure of the generator 400 does not need to extend along the length of the membrane 8 if suitable separated fixture points can be created or identified. In this particular embodiment, clamps 14 and 28 trap one side of the membrane 8, and clamps 12 and 30 trap the other side of the membrane 8. These clamps are attached to vertical surfaces 32a, 32b. As with the previous embodiments, the tensioning of the membrane 8 is established as the anchor sets 6a, 6b attached to the membrane 8 are stretched to, and fixed at, a given distance from one another. In this case, the distance is defined by the distance between the surfaces 32a, 32b. Note that while the technique of pre-affixing anchor sets to the membrane allows for consistent tensioning of the membrane, a roughly consistent tensioning can also be achieved without use of the anchor sets. The clamps 14, 28 and 12, 30 can simply trap the membrane under positive or minimal tension, either by pre-clamping the membrane and then adhering the clamps to the respective vertical surfaces 32a, 32b or capturing a given externally applied tensioning of the membrane while the clamps are affixed to the vertical surfaces 32a, 32b.

Figure 6A:
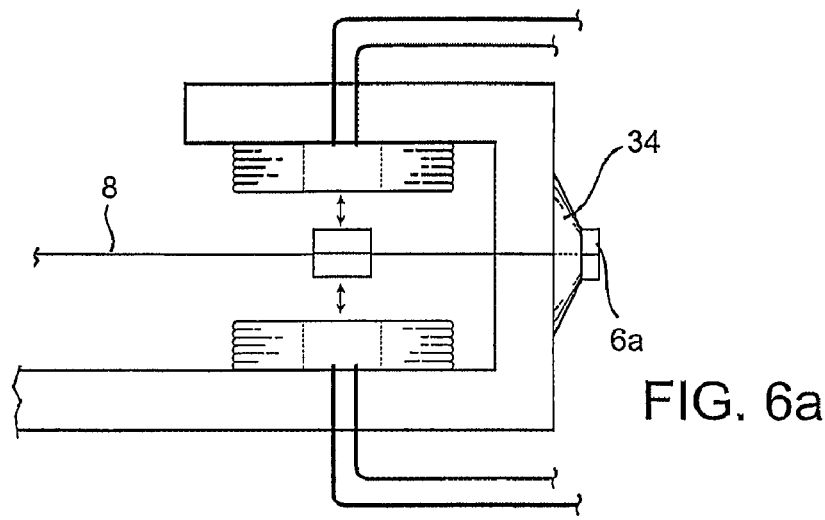
FIGS. 6a-6c show examples of dynamic tensioning for use in an exemplary generator.
Figure 6B:
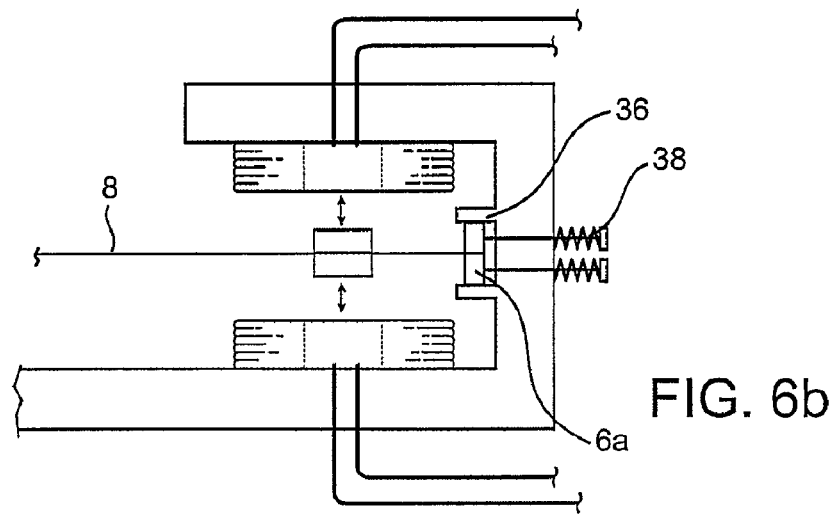
Figure 6C:
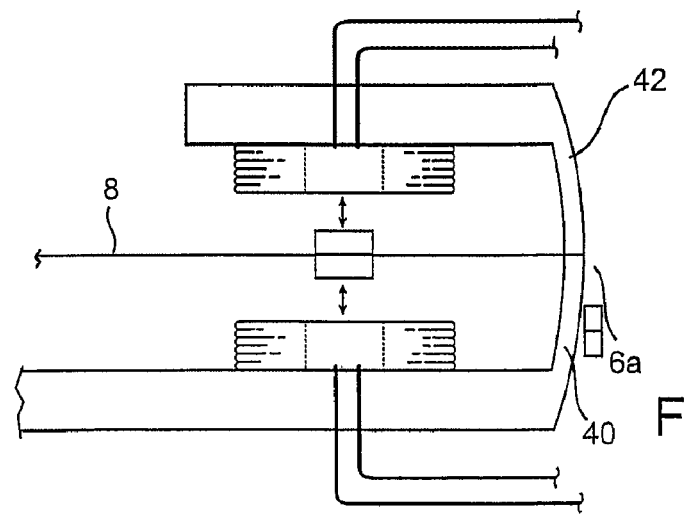

As discussed previously, the tension of the membrane 8 plays an important role in promoting oscillations when subject a fluid flow. However, after being used over time, the membrane 8 may stretch and deform, which may eventually cause significant reduction in membrane tension. FIGS. 6a-6c depict examples of dynamic tensioning means for maintaining constant tension of the membrane 8, despite of the existence of possible membrane deformation.

As shown in FIG. 6a, in addition to anchor set 6a, the generator incorporates a Belleville spring washer 34 between the supporting structure and the membrane anchor set 6a. Even if the membrane 8 may stretch over time, the spring washer 34 maintains constant tension on the membrane 8 as the membrane 8 is pulled by the washer 34 through a slot disposed on the supporting structure 10. An alternating stack of Belleville spring washers, as is well understood in the art, may be used to accommodate more significant deformations in the membrane 8.

The same effect provided by the structure shown in FIG. 6a may be achieved in a variety of ways. As shown in FIG. 6b, instead of using a spring washer 34, a spring coil 38 is used to dynamically tension the membrane 8 by pulling anchors set 6a within an anchor channel 36. FIG. 6c depicts an embodiment that incorporates the spring mechanism into the geometry of the supporting structure. As shown in FIG. 6c, a slight arch of the ends of supporting structures 40 and 42 provides a roughly constant spring force on the membrane 8 under small deviations. An advantage of incorporating a constant spring force in the supporting structure assembly is that a particular tension may be more easily applied to the membrane, over a wider range of clamping distances. In another embodiment, a separate constant spring can be incorporated into a two-part supporting structure with two halves that move more distant from one another as the membrane 8 stretches.

According to still another embodiment, the restoring spring force can be built into the length of the supporting structure itself, so that as the membrane is tensioned and the anchor sets moves slightly more distant, the coils also move outwards to stay in alignment with the magnets. Compliant mechanism techniques, whereby this restoring spring force can be established by cutting particular profiles into the supporting structure itself, can be used. This technique is useful for handling larger deviations of the membrane 8, where the magnets 4a, 4b are pulled substantially out of alignment with coils 2a, 2b.

It is understood that magnets with various polarization orientations may be used to implement the generators described in this disclosure, such as axially magnetized magnets, diametrically-magnetized magnets, magnets with both diametrically-oriented and axially-oriented poles, etc. For instance, diametrically-magnetized magnets of various shapes or appropriately shaped axially-magnetized magnets may be employed. This may be useful in generators subjected to significantly variable fluid flow speeds, since side mounted coils would not impede the greater membrane displacement that may intermittently occur. In this case, more than one set of coils may be side-mounted (e.g., multiple coils stacked in the 46b and 46d planes) to take advantage of increased displacement of the membrane-mounted magnets in more powerful fluid flows. In addition, multiple diametrically-oriented and/or axially-oriented poles can be incorporated into a single magnet. Corresponding coils can then be arranged to capture the flux produced when such a magnet is oscillated.

Air-core type coils are suitable for implementation in generators described in this disclosure, to avoid "cogging" or generator stalling that is generally caused by heavily ferromagnetic cores. However, coils with ferromagnetic cores may also be used; in certain cases these coils with cores will yield improved electrical power generation. For instance, the "cogging" or generator stalling caused by heavily ferromagnetic cores can be mitigated by an even distribution of coil material. The cores may be filled with a ferromagnetic material (e.g., iron, laminated steel, nickel, mumetal) to increase magnetic flux that is channeled through the coil cores without overly restrictive cogging.

Another useful aspect, particularly pertaining to coils with ferromagnetic cores, involves membrane dampening using a back-EMF through a set of conductive coils. If a set of side-mounted coils, preferably with ferromagnetic cores, such as 46b,d as depicted in FIG. 8b, are connected in a parallel circuit configuration (when a current is flowing), the oscillation of the magnetic field generator mounted on the membrane 8 may be reduced by altering the configuration of that parallel connection. This is useful for the following scenario: In fluid flow speeds of up to 30 mph, a generator of the sort described herein may safely output electrical power through two coils connected in parallel, with constructive current flows. However, in higher fluid flow speeds, certain embodiments of these generators may be in danger of being damaged. In those situations, the connections between the coils can be switched, by a relay or similar means, so that the current flows through the two coils is in opposition. In other words, as the magnetic field generator moves across the face of coil 46d, a flow of electrical current is produced which then flows into coil 46b. This current flow in coil 46b produces a magnetic field which, in conjunction with the current flow in coil 46d, dampens the oscillation of the magnetic field generator mounted on the membrane 8.

In other situations, it may be advantageous to capture the substantially greater energy available in higher fluid flow speeds. However, the oscillation of the membrane 8 may also preferably be dampened in these higher flow speeds, so as to prevent damage. By increasing the load presented to the generator, such as by attaching an ultracapacitor, when fluid flows increase in speed, the additional energy available in these situations may be captured and the oscillation of the membrane 8 similar dampened, by way of an increased back-EMF through the coils. This technique is similar to that employed in regenerative breaking in hybrid vehicles, wherein a rotational oscillation of a wheel is dampened by overloading a generator attached to said wheel with a capacitor. The energy that comes from that overloading is then captured by the capacitor and subsequently used to charge a battery bank. However, while this technique is known in the field of rotating systems, it has thus far been unexplored in membrane-based generators of the sort first described in this disclosure.

FIG. 7a is a perspective sectional view of a variation of the membrane 8 for use in a generator according to this disclosure. Instead of capturing the end of the membrane 8 directly with the supporting base 10 and the clamp 12, as described initially in FIG. 1a, the embodiment in FIG. 7a provides a coating 52a, 52b on both surfaces of the membrane 8. For the purpose of illustration, simplified clamps 54a, 54b are provided to illustrate the manner by which the coated membrane end is fixed in position. The coating 52a, 52b may be of a rubberized material, a silicon coating, a high durability adhesive coat, or any number of coatings that imparts additional durability at the flexing joint where the end of the membrane emerges from the clamps 54a, 54b. This approximate placement of the coating on the membrane 8 with reference to the clamps 54a, 54b is illustrated in FIG. 7b.

FIGS. 11a and 11b depict a variation of membrane 8 shown in FIGS. 10a and 10b, with addition of a hinge 56. The hinge 56 may be implemented in a variety of forms, such as a typical butt-hinge, a flexture such as a living-hinge structure, or a MEMS hinge (e.g., similar to the high-reliability hinges well-known in the art of micromirror displays and the like). The addition of the hinge 56 eliminates the stress that the membrane 8 experiences at the interface between the clamps 54a, 54b and the end of the membrane 8.

Figure 9:
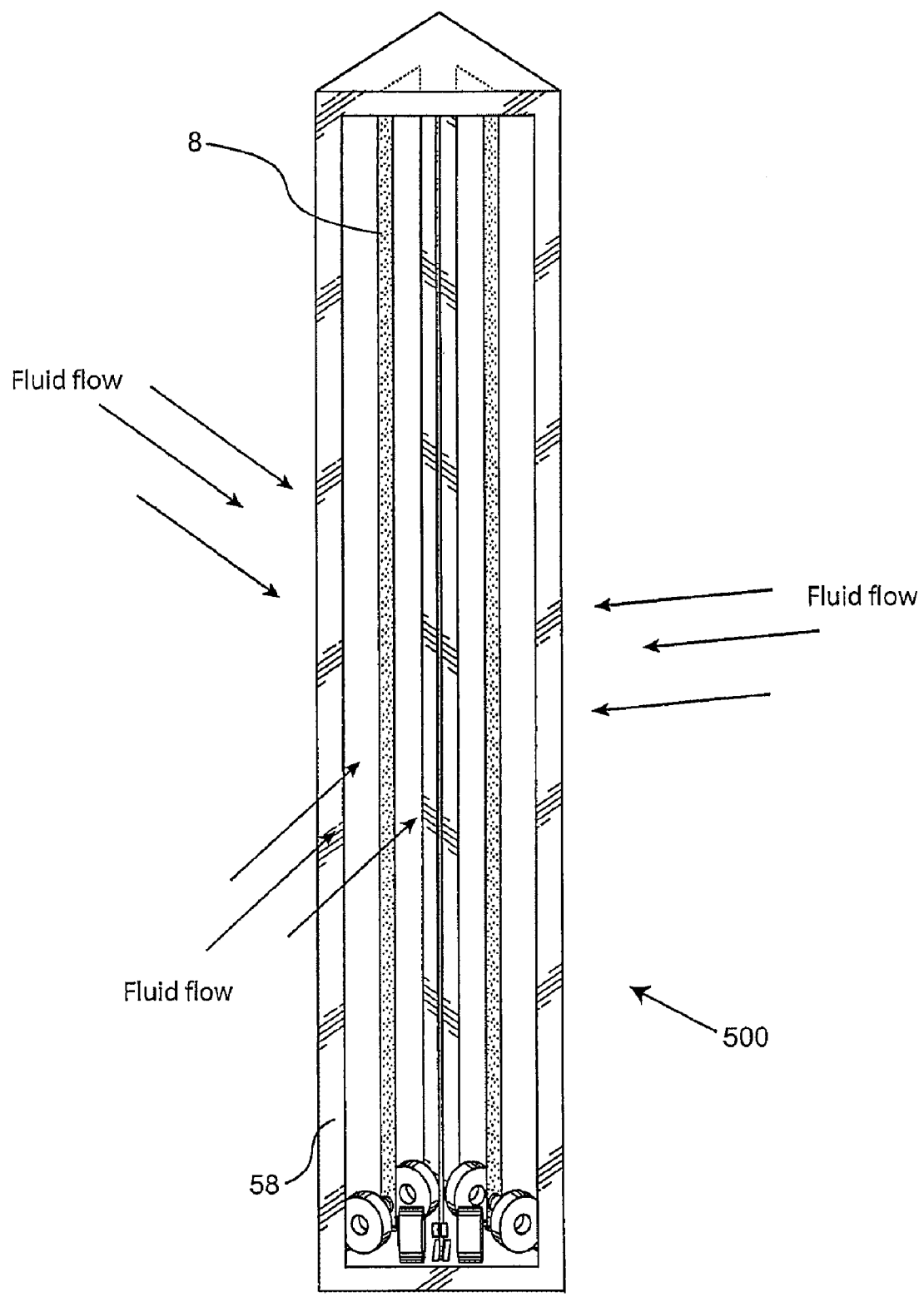
FIG. 9 is a perspective view of an exemplary generator with a triangular supporting structure having a plurality of membranes, to accommodate fluid flows from different directions.

Generators implemented according this disclosure can receive fluid flow from a variety of attack-angles, and convert the fluid flow into electrical energy with varying levels of efficiency, depending on the angle of attack. FIG. 9 depicts an exemplary electrical generator 500 having multiple generator units to accommodate fluid flows from different directions.

Each generator unit includes a membrane 8, at least one coil, and at least one magnet for applying a magnetic field to the at least one coil. One of the magnet and the coil is attached to the membrane and moves with the membrane. As discussed earlier, the vibration of each membrane caused by the fluid flow creates a relative movement between the coil and the magnetic field, which induces a current flow. A power conditioning circuit is provided to condition the current generated by each generator unit.

As illustrated in FIG. 9, the surface planes of the membranes are positioned at 120 degrees offset from one another. A triangular supporting structure 58 is provided to support the membranes. The unique arrangement of membrane orientations shown in FIG. 9 allows the generator 500 to efficiently harvest energy from fluid flowing from a multitude of attack-angles. One or more of the membranes 8 is compelled into oscillation by this fluid flow.

It is understood that the number of membranes used in implementing the generator 500 is not limited to three. Other numbers of membranes, such as two, four, five or thirty or any other number depending on design preferences and cost considerations, may be used to accommodate fluid flows from different directions. It is further understood that the a variety of offset angles between the membranes may be used to accommodate fluid flows from different directions, such as 15 degrees, 30 degrees, 60 degrees, 180 degrees, etc. Furthermore, any two offset angles between the membranes do not have to be identical.

In one embodiment, a rotating base and vane can be added to a generator according to this disclosure to turn the leading membrane edge directly into the flow of the fluid, thereby increasing the overall electrical output of the generator. This technique is well-known in the art of traditional, turbine-based wind generators. However, as the embodiment of FIG. 9 illustrates, other options utilizing a stationary supporting structure are also viable.

Figure 10:
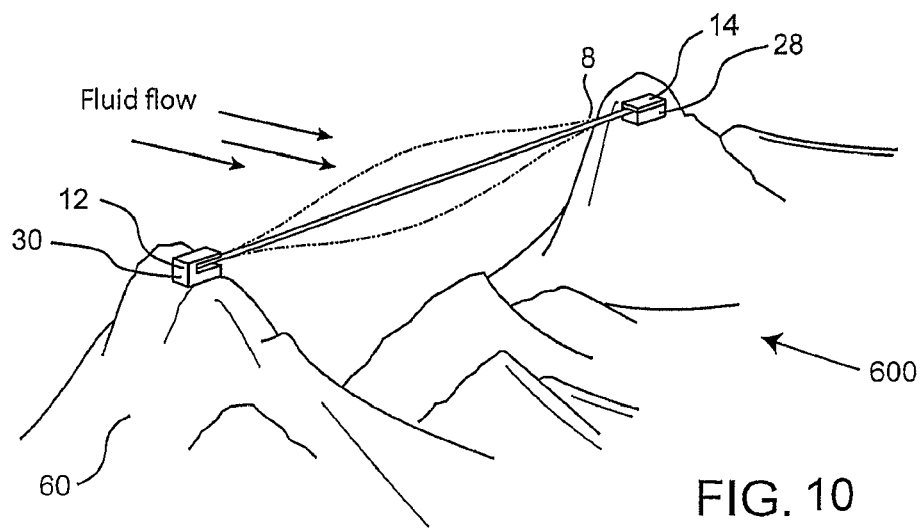
FIG. 10 is a depiction of a larger-scale implementation of an exemplary generator.

Different types of supporting structure may be used to implement a generator with multiple generator units. For instance, FIG. 10 depicts a large-scale implementation of a generator 600, similar to the generator 400 depicted in detail in FIG. 5. In this particular implementation, the ends of the generator 600 are affixed to two mountains, with the membrane 8 extending across the valley portion of the landscape. Wind often flows with high speeds through the valleys formed by mountain ranges, and the generator 600 captures the energy embedded in those flows and converts the captured energy into electricity.

Figure 11:
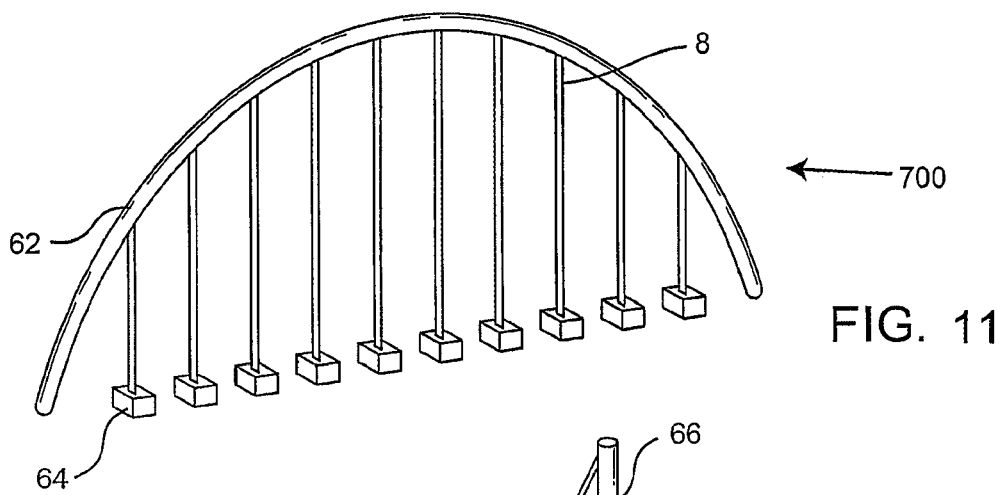
FIG. 11 is a depiction of another alternative implementation of a plurality of generator units

FIG. 11 depicts another exemplary generator 700 implemented with multiple generator units or membranes 8 and an arched supporting structure 62 disposed on a supporting base, such as the ground, rooftop, platform, riverbed, or any surface that has sufficient strength to support the generator 700. Each membrane has one end attached to the supporting structure 62 and the other end attached to the supporting base. For ease of illustration, the magnetic field generator and conductive coils are collectively shown as block structures 64. The arched supporting structure 62 can be made of bent metal or plastic tubing that has sufficient strength to support the membranes. The generator 700 may be a stand-alone generator or incorporated into an existing structure, such as a bridge or overpass. The surface planes of the membranes may have the same orientation or different orientations.

Figure 12:
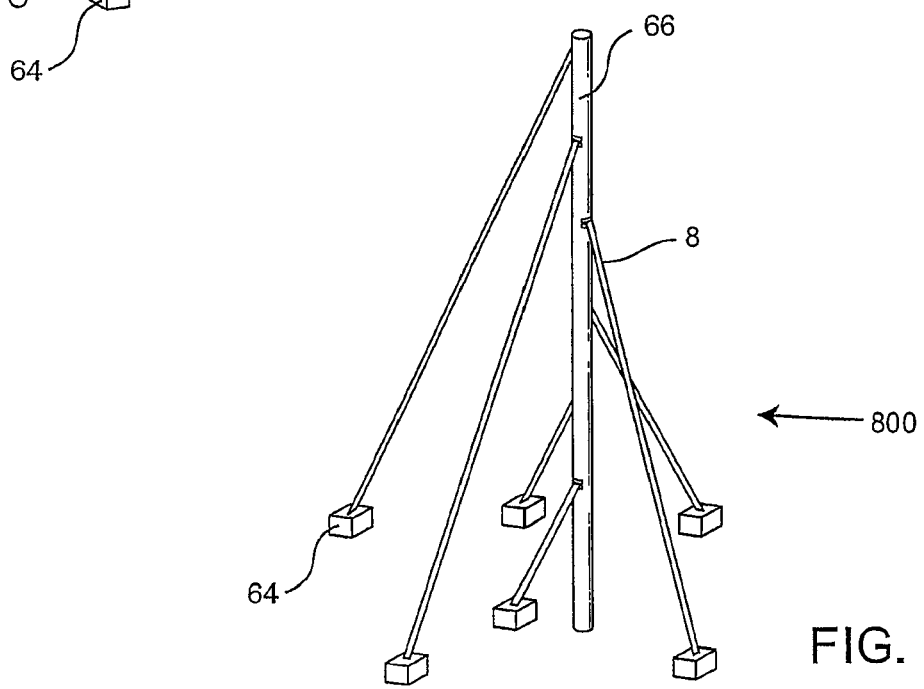
FIG. 12 is a depiction of still another alternative implementation of a plurality of generator units.

FIG. 12 depicts another variation of generator implemented with multiple generator units or membranes. The generator 800 includes multiple generator units including membranes 8 and a supporting pole 66 disposed on a supporting base, such as the ground, rooftop, platform, riverbed, or any surface that has sufficient strength to support the generator 800. Each membrane has one end attached to the supporting pole 66 and the other end attached to the supporting base. The surface planes of the membranes may have the same orientation or different orientations. Similar to FIG. 11, the magnetic field generator and conductive coils are collectively shown as block structures 64 for ease of illustration. This generator 800 allows the supporting pole 66 to serve as both a supporting structure and a generator tower. It is noted that higher wind speeds may be attained at heights above ground level, such as 10 meters or more above the ground, which can be accessed by mounting a generator on a tower or pole structure.

A variation of the generator 800 shown in FIG. 13a utilizes two membranes 8 attached to the supporting pole 66 by two brackets 67a, b, to accommodate different directions of airflows or fluid flows. A close-up top view of this variation is depicted in FIG. 13b. This variation allows for efficient electrical generation using fluid flows arriving from any direction in the plane that intersects and is substantially perpendicular to the long axis of the membranes 8. Another variation is depicted in FIG. 13c, in which four membranes 8 are supported at approximately a 90 degree angle from one another. This variation is useful in those particular generator embodiments where the membrane 8 is more easily compelled into oscillation by fluid flows arriving from one particular edge of the membrane. All of the embodiments depicted in FIGS. 16a, b, c have the advantage of operating with fluids flows with a wide variety of approach vectors, thereby obviating the need for a vane or means of rotating the generator to capture a particular directional fluid flow.

Pole-mounted variations, such as that depicted in FIG. 13a, also have an advantage of a simple sort of "furling" mechanism. Supporting pole 66 may be constructed of a flexible carbon composite, bamboo, or other slightly flexible elongated member. Within a certain range of fluid flow speeds, such as from 5 mph through 15 mph, the forces exerted on the generator and oscillating membranes could only slightly bend the pole 66, and so most of the cross-sectional area of the oscillating membranes would be exposed to the incoming airflow. However, in higher fluid flow speeds, the forces exerted on the oscillating membranes would begin to bend the pole 66, and so to creating an angle between the incoming fluid flow vectors and the long-axis of the membranes. This effectively reduces the exposed cross-sectional area of the oscillating membranes that is presented to the incoming fluid flows, and can thereby provide a mechanism to maintain generator operation without damage, even in higher fluid flow speeds.

Figure 14:
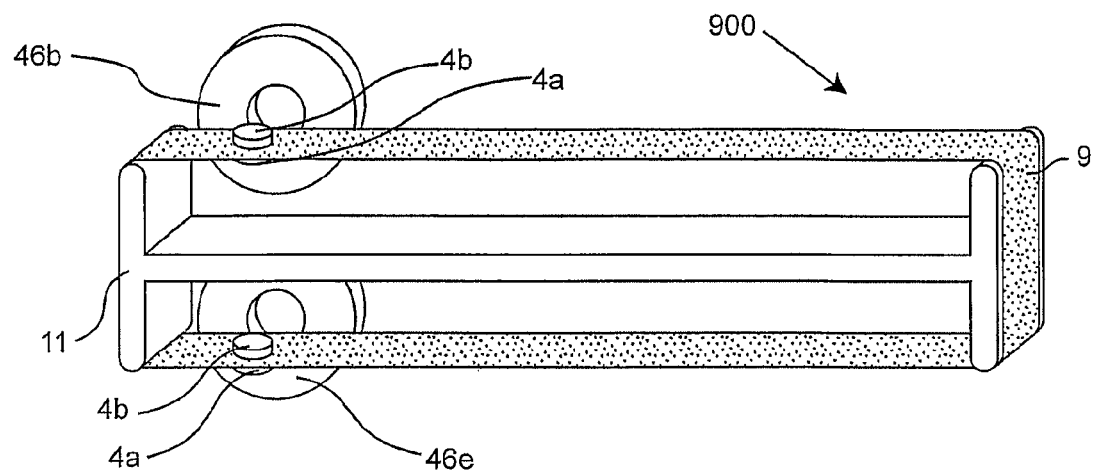
Figure 14:
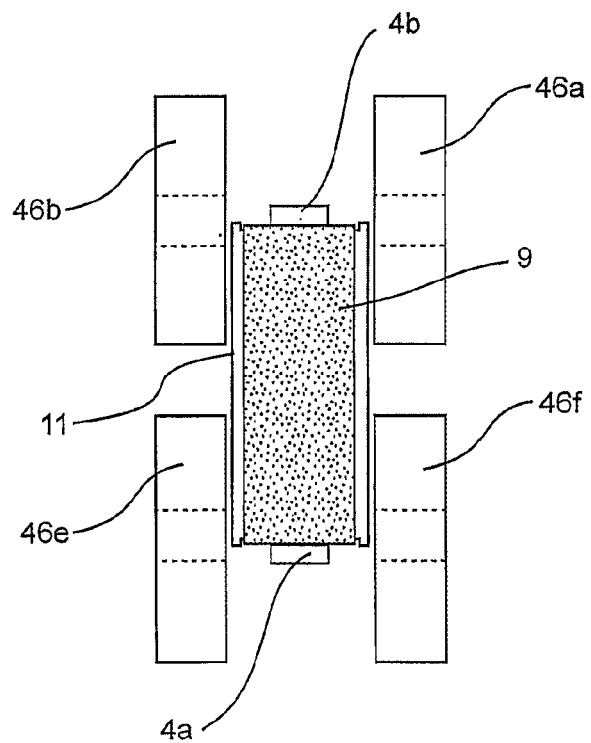

FIG. 14a depicts a variation of the generator shown in FIG. 1. In this embodiment, indicated by the numeral 900, the membrane material is formed into a continuous loop or belt 9 encircling or wrapping around a supporting structure 11. The membrane loop may be formed by an elongated membrane having one end of the membrane attached to the other using various types of attachment means, such as adhesives, clasps, heat welding, adjustable ties, etc. The looped membrane 9 is then wrapped or fastened around the supporting structure 11. The loop length of the membrane and the dimensions of the supporting structure are carefully selected so that when the membrane loop 9 is formed and attached to the supporting structure 11, a sufficient membrane tensioning is created. A close-up back view of this variation is depicted in FIG. 14b.

In this particular embodiment, membrane anchors as described relative to FIG. 1 are not required, as the fixed circumference (e.g., loop length) of the looped membrane provides the consistent membrane tensioning on a fixed mounting structure that the anchors sets provide in other embodiments. An additional advantage of this embodiment is that equal tensioning is applied on two opposing sides of the mounting structure. Because the forces on two opposing sides of the mounting structure are substantially equivalent, and compressive in nature, the requirement for rigidity of the mounting structure can be reduced. Additional cost benefits are also gained with multiple active membranes sharing a common mounting structure (e.g., a membrane "loop" may serve as two active oscillating membranes, although this dual-use is not necessary). In addition, as the membrane loop is not clasped into a mounting structure or clamp, but rather wraps around the mounting structure, the wrapping, rather than clamping, mitigates the stress on the membrane at the interface with the mounting structure, and thereby offers increased lifetime of the membrane.

Also of note regarding the generator 900 depicted in FIGS. 17*a*, *b*, side-mounted coils are depicted. As has been described with reference to related embodiments in this disclosure, mounting electrically-conductive coils so that the magnetic field generators mounted on the oscillating membrane move substantially across the face of the coils, rather than approaching and receding from the face of the coils, can be advantageous in highly variable fluid flow situations. Only two coils, 46*b,e* have been pictured in FIG. 14*a*, for clarity, but more coils may be employed. Indeed, FIG. 14*b* depicts an embodiment utilizing four coils 46*a,b,e,f*, two per length of oscillating membrane. While not depicted for clarity, ferromagnetic core material added to the conductive coils would, in many situations, increase the electrical output of this variation, and so is preferred. That said, orienting the coils above and below the oscillating magnetic field generator, such as is depicted in FIG. 1, is also a useful arrangement for certain situations of well-known fluid flow conditions.

Figure 15:
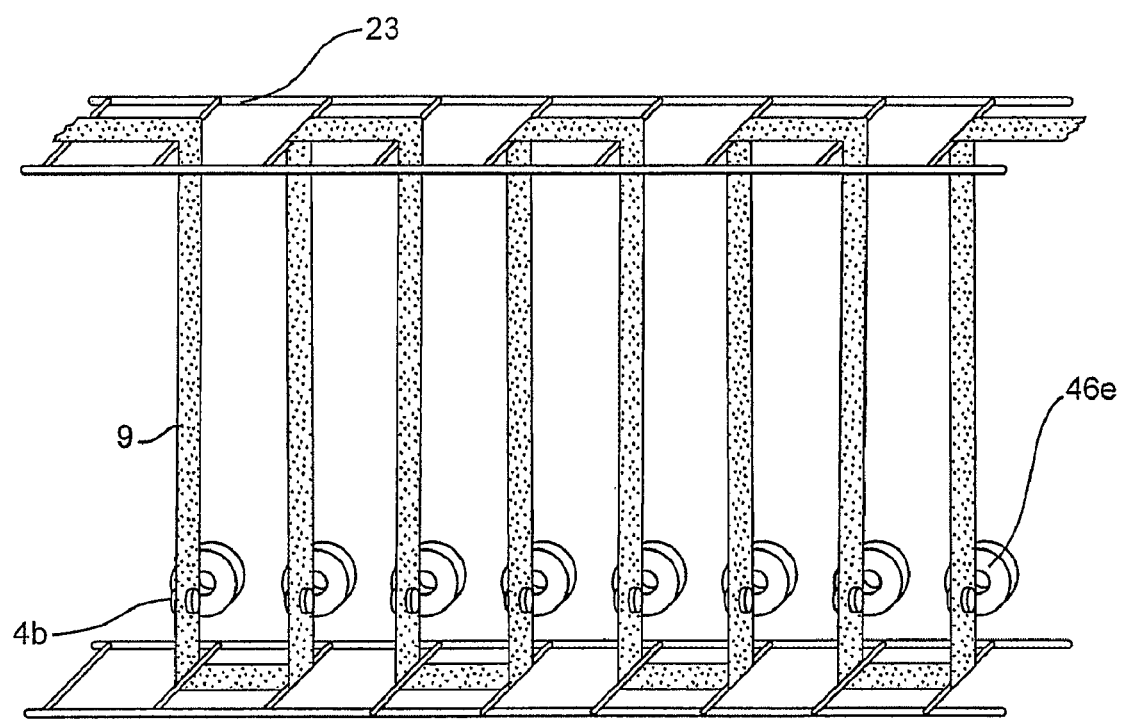

Another variation of this type of continuous looping membrane is illustrated in FIG. 15. Multiple belts 7, in a manner similar to that depicted in FIG. 4, can be mounted to a common structure 23. These belts can be made to resonate in phase, both by virtue of equal tensioning and by electronic (e.g., a constant, shared back-EMF, for instance) and magnetic repulsion means (e.g., the magnetic field generators on each length of membrane may be mounted in close proximity to one another in magnetic opposition, thereby helping to keep oscillations of the various membrane lengths in phase). Note that the individual exposed lengths of membrane material may be isolated from one another as well, by addition of a clasp at the mounting structure. This may be necessary in those instances in which many loops of membrane material are housed in the same mounting structure and resonance between the many exposed lengths of membrane material is difficult to maintain in practice. Also note, while a single conductive coil 46*e* has been depicted for each exposed membrane length for clarity of illustration, multiple coils may be used for any number of the exposed membrane lengths and those coils many be side-mounted, top-mounted, and with air or ferromagnetic cores.

A membrane of an exemplary generator may be conditioned to promote vibrations when subject to fluid flows from a specific direction but not from the opposite direction. The leading and trailing edges of the membrane relative to a preferred fluid flow direction may be tensioned to different tensioning degrees. One benefit of applying different tensioning degrees of the edges is to encourage oscillation at lower wind speeds. In these instances, the membrane will accommodate one direction of fluid flow better than fluid flows from the opposite direction.

In one embodiment, the magnetic field generator or electrical conductor is not be mounted directly on the centerline of the membrane, but rather mounted closer to one edge of the membrane, such as the leading or trailing edge relative to a preferred fluid flow direction. This arrangement encourages a self-starting oscillation and also may yield a more energetic oscillation.

In another embodiment, the tensioning of the membrane is adjusted depending on fluid flow speed, to yield higher frequencies of oscillation at higher fluid flow speeds, without significantly larger displacement of the membrane. For instance, an adjustable tensioning device may be provided to adjust the tensioning of the membrane, such as loosen or tighten the membrane.

Various types of supporting structures or mounting means may be used to implement the generators according to this disclosure. For example, instead of utilizing a rigid, stationary structure to hold the membrane under tension, an mobile, aerial floating or lifting device, such as a kite or balloon, can hold a membrane under tension. In this embodiment, the buoyancy and wind acting against the balloon, kite, or other aerial floating or lifting structure provide a tensioning on the membrane 8, one end of which may be attached to the ground or to be held taut between cables or straps attached to the ground and the aerial structure. According to another embodiment, a generator according to this disclosure, such as that shown in FIG. 1*a*, is attached to an aerial floating or lifting device like a balloon or kite, to allow the generator access to the higher wind speeds at great altitudes without the expense of a tall mounting tower.

It should also be noted that the membrane and the mounting structure should not be treated as completely independent from one another. Indeed, the oscillation of the membrane of these various embodiments also excites frequencies of oscillation in the mounting structure that houses said oscillating membrane. In a manner similar to the sustained and powerful vibrations of a fine stringed musical instrument, such as a violin or a guitar, the oscillation of the membrane may be enhanced by choosing appropriate materials and geometries of the mounting structure. Also, the oscillation of the membrane may be enhanced or dampened by isolating or securely joining the mounting structure to a grounded base, depending on the natural resonance of that grounded base. Resonating cavities molded into the mounting structure itself may also enhance the vibration of the membrane as well.

It is understood that variations of the embodiments described in this disclosure may be achieved by switching the locations and/or structures of the magnets and coils. For instance, one or more magnets may be attached to a membrane having one or more coils in the proximity of the magnets; and conversely, one or more coils may be affixed to a membrane having at least one magnet disposed in the proximity of the coils.

Generators implemented according to this disclosure may be used to power flying vehicles, such as ultra-light, human-carrying planes or autonomous flying devices. The drafts and airflows present at higher altitudes can be captured by a plane-mounted generator of the sort disclosed herein, charging up a battery or capacitor bank to energize a propeller system.

Certain dimensional parameters, such as dimensions of the membrane 8 and the placement and geometry of the magnets 4*a*, 4*b*, are found useful in building an efficient generator. It has been noted that a length-to-width ratio of the membrane 8 of approximately 40:1 is beneficial in establishing a highly energetic flutter oscillation. Ratios ranging from 30:1 to 1000:1 also make for effective, efficient generators. The magnets may assume various shapes, such as disk-shaped or rectangular, having a width or diameter approximately equal or less than the width of the membrane, although exceptions apply. Furthermore, placing the center of the magnets near one end of the membrane, at a distance of between $1/100^{th}$ to $1/10^{th}$ of the entire length of the membrane is useful in converting a flutter oscillation into a reduced torsional, arched oscillation of the magnets.

According to one embodiment utilizing the configuration illustrated in FIG. 1a, the membrane 8 has an elongated shape having two fixed ends. The membrane is made of slit taffeta with mylar coating, and the length of the membrane between the inner clamping edges of the supporting base 10 is 455 mm long. The membrane 8 is 11 mm wide and 0.1-0.15 mm thick. The centers of two magnets 4a, 4b are adhered to the surfaces of the membrane at 15 mm from one fixed end. The magnets 4a, 4b are affixed to both surfaces of the membrane 8, concentric with each other. The magnets 4a, 4b are of the NdFeB type, with a disk shape of 10 mm in diameter, 2 mm thick, with surface field of 2450 Gauss, and a weight of 1.17 g each. Two electrical conductive coils are affixed to the supporting base 10 and the clamp 12 with the coil opening in an approximately parallel plane to the surface of the membrane 8. The coils are made of 30 awg enamel coated copper wire, each with approximately 735 turns and having a resistance of approximately 16-18 ohms. The coils are approximately 12 mm inner diameter, and 30 mm outer diameter. These coils are wired in series to achieve a total resistance of approximately 32-36 ohms. The base is made of extruded aluminum. The vertical oscillation of the membrane, peak to peak, is approximately 20 mm. This embodiment generates approximately 35-40 mW across a matched load, in a 9-12 mph wind (4-5.3 m/s), sufficient for powering a wireless transceiver for continuous RF transmission of information, such as temperature and voltage, charging capacitors in the wireless transceiver, powering white LEDs, charging Li-ion batteries, charging cell phones, and operating motors.

The embodiment described in FIG. 1 also performs at a considerable level of efficiency at larger scales. To take one operating example, the length of the membrane between the inner clamping edges of the supporting structure 10 is 1.295 meters long. The membrane in this particular embodiment is 14 mm wide and 0.1-0.15 mm thick. The centers of two magnets 4a, 4b are adhered to the membrane at 31.5 mm from one fixed end. The magnets are affixed to both surfaces of the membrane, concentric with each other. The magnets are of the NdFeB variety, with a disk shape of 12.7 mm diameter, 3.1 mm thick. Two electrical conductive coils are affixed to the supporting structure 10 and the clamp 12 with the coil opening in an approximately parallel plane to the surface of the membrane 8. The vertical oscillation of the membrane, peak to peak, is approximately 20 mm in a 9 mph wind (4 m/s). This particular generator variation also benefits from additionally or exclusively side-mounted coils (such as the coils 46b and 46d in FIG. 8b). Moreover, the addition of core materials (e.g., a ferromagnetic material, such as iron) to the inside and/or along the backing of the coils may enhance the electrical output, and allow for generator operation in a wider variety of fluid flow speeds.

Figure 16:
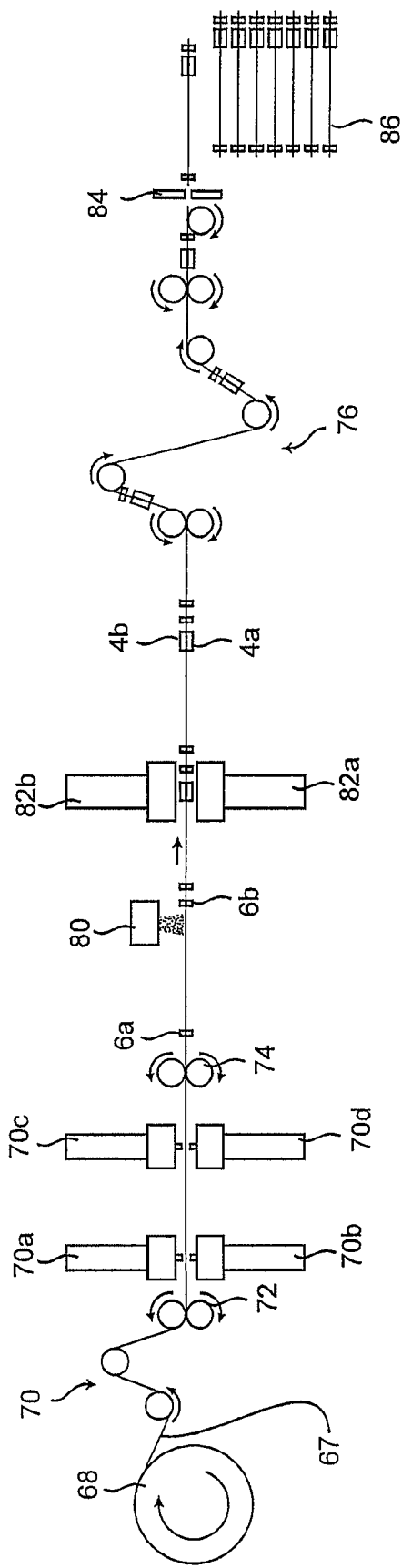
FIG. 16 is a schematic depiction of a manufacturing process by which the membrane component of the exemplary generator may be produced.

FIG. 16 shows a manufacturing process for producing a consistently tensioning membrane component of the generators described herein. A continuous belt of membrane material 67 is pulled off of unwind roller 68 by driver rollers 72 over feed adjustment rollers 70. Anchor applicators 70a-70d apply anchor sets 6a, 6b to the belt 67. An adhesive is applied to the belt 67 by adhesive applicator 80 as the belt is pulled by another set of driver rollers 74. This adhesive adheres the magnets 4a, 4b to the belt 67 when the magnets are applied by magnet applicators 82a, 82b. The belt with magnets and anchors sets is then fed over a dancer roller assembly 76 to transform the continuous travel of the belt 67 into a discrete, step-wise advance. A cutter 84 then cuts the continuous belt 67 into separate membranes with affixed anchor sets and magnets, indicated by numeral 86.

Because the distance between the anchor sets 6a, 6b is known and well-controlled in this manufacturing process, when the anchors sets 6a, 6b are fixed into a supporting structure of given width, a specific tension on the membrane 8 will be generated. In this way, consistent tensioning of the membrane 8 is possible in a mass manufacturing approach, without the need for highly technical assembly. Many other approaches for manufacturing the generators described in this disclosure are also possible, including individually tensioning and measuring the tension of each membrane fixed into each individual supporting structure or clamp set.

This disclosure has been described with reference to specific embodiments thereof. It will, however, be evident that various modifications and changes may be made thereto without departing from the broader spirit and scope of the disclosure. The concepts described in the disclosure can apply to various operations of the networked presentation system without departing from the concepts. The specification and drawings are, accordingly, to be regarded in an illustrative rather than a restrictive sense.

What is claimed is:

1. An electrical generator comprising:
   a supporting structure;
   a flexible membrane including a width and a thickness that is substantially less than the width and having at least two ends supported by the supporting structure and defining a central axis between the two ends, wherein the membrane vibrates when subject to a fluid flow substantially transverse to the central axis;
   at least one electrical conductor and at least one magnetic field generator configured to apply a magnetic field to the at least one electrical conductor, wherein the at least one magnetic field generator is attached to the membrane and configured to move with the membrane, wherein the movement of the magnetic field generator is substantially transverse to both the central axis and the fluid flow;
   wherein the vibration of the membrane caused by the fluid flow creates a relative movement between the at least one conductor and the magnetic field generated by the at least one magnetic field generator; and
   whereby the relative movement creates a change in the strength of the magnetic field applied to the at least one electrical conductor; and
   the change in the strength of the magnetic field induces a current.

2. The generator of claim 1, wherein the membrane is supported by the supporting structure via a hinge.

3. The generator of claim 1 further comprising a tensioning device configured to provide a tension force to the membrane.

4. The generator of claim 3, wherein the tensioning device provides a constant tensing force to the membrane.

5. The generator of claim 3, wherein:
   the membrane has a substantially elongated shape between the two ends, and the width includes two main surfaces on opposite sides of the membrane and the thickness includes a first edge and a second edge; and
   the tensioning device is configured to provide different tension forces to the first edge and the second edge.

6. The generator of claim 1, wherein:
the supporting structure includes two substantially parallel supporting units; and
the membrane includes a membrane loop suspended between the two supporting units.

7. The generator of claim 1, wherein the membrane vibrates when the membrane aeroelastically flutters when subject to the fluid flow.

8. The generator of claim 1, wherein the flexible membrane has a profile shape selected from the group consisting of: tapered, flat, and airfoil-like.

9. An electrical generator comprising:
supporting means;
means for vibrating when subject to a fluid flow, wherein the vibrating means includes a width and a thickness substantially less than the width and has at least two ends supported by the supporting means and defines a central axis substantially transverse to the fluid flow;
electrical conducting means;
means for generating a magnetic field applied to the electrical conducting means, wherein the magnetic field generating means is attached to the vibrating means and configured to move with the vibrating means, wherein the movement of the magnetic field generating means is substantially transverse to both the central axis and the fluid flow;
wherein the vibration of the vibrating means caused by the fluid flow creates a relative movement between the electrical conducting means and the magnetic field; and
whereby the relative movement creates a change in the strength of the magnetic field applied to the electrical conducting means; and
the change in the strength of the magnetic field induces a current.

10. The generator of claim 9 further comprising means for providing a tension force to the vibrating means.

11. The generator of claim 10, wherein the tensing force is a constant force.

12. The generator of claim 9, wherein:
the supporting means includes two substantially parallel supporting units; and
the membrane includes a membrane loop suspended between the two supporting units.

13. The generator of claim 9, wherein the vibrating means aeroelastically flutters when subject to the fluid flow.

14. An electrical generator comprising:
a supporting structure;
multiple generator units, each generator unit includes:
at least one flexible membrane including a width and a thickness that is substantially less than the width and having at least two ends supported by the supporting structure and defining a central axis between the two ends, wherein each membrane vibrates when subject to a fluid flow substantially transverse to the central axis
at least one electrical conductor and at least one magnetic field generator configured to apply a magnetic field to the at least one electrical conductor, wherein one of the at least one electrical conductor and the at least one magnetic field generator is attached to the membrane and configured to move with the membrane, wherein the movement of the magnetic field generator is substantially transverse to both the central axis and the fluid flow;
wherein:
the vibration of each membrane caused by the fluid flow creates a relative movement between the at least one conductor and the magnetic field generated by the at least one magnetic field generator;
the relative movement creates a change in the strength of the magnetic field applied to the at least one electrical conductor; and
the change in the strength of the magnetic field applied to the at least one electrical conductor induces a current; and
a power conditioning circuit, coupled to each generator unit, configured to condition the current generated by each generator unit.

15. The generator of claim 14, wherein at least one of the membranes has a surface plane that is not parallel to a surface plane of another membrane.

16. The generator of claim 14, wherein:
the supporting structure includes two substantially parallel supporting units; and
each membrane has a first end supported by one of the supporting units, and a second end supported by the other supporting unit.

17. The generator of claim 14, wherein:
the supporting structure includes a substantially arch-shaped supporting unit disposed on a supporting base; and
each membrane has a first end supported by the substantially arch-shaped supporting unit, and a second end supported by the supporting base.

18. The generator of claim 14, wherein:
the supporting structure includes a vertical supporting unit disposed on a supporting base; and
each membrane has a first end supported by the vertical supporting unit, and a second end supported by the supporting base.

19. The generator of claim 14, wherein:
the supporting structure includes a vertical supporting unit disposed on a supporting base; and
each membrane has both a first and second end supported by the vertical supporting unit.

20. The generator of claim 14, wherein:
the supporting structure includes multiple frames disposed on different planes; and
each frame supports at least one membrane.

21. The generator of claim 14, wherein:
the supporting structure includes two substantially parallel supporting units; and
at least one of the membrane units includes a membrane loop suspended between the two supporting units.

22. The generator of claim 14, wherein at least one of the membranes vibrates when the membrane aeroelastically flutters when subject to the fluid flow.

23. An electrical generator comprising:
supporting means;
multiple generator units, each generator unit includes:
means for vibrating when subject to a fluid flow, wherein the vibrating means includes a width and a thickness substantially less than the width and has at least two ends supported by the supporting means and defines a central axis substantially transverse to the fluid flow;
electrical conducting means; and
magnetic field generating means for applying a magnetic field to the electrical conducting means, wherein one of the electrical conducting means and the magnetic field generating means is supported by the vibrating means and configured to move with the vibrating means, wherein the movement of the magnetic field generating means is substantially transverse to both the central axis and the fluid flow;

wherein:
the vibration of the vibrating means caused by the fluid flow creates a relative movement between the electrical conducting means and the magnetic field generated by the magnetic field generating means;
the relative movement creates a change in the strength of the magnetic field applied to the electrical conducting means; and
the change in the strength of the magnetic field applied to the electrical conducting means induces a current;
and
power conditioning means for conditioning the current generated by each generator unit.

24. The generator of claim 23, wherein:
the supporting means includes two substantially parallel supporting units; and
each vibrating means has a first end supported by one of the supporting units, and a second end supported by the other of the supporting units.

25. The generator of claim 23, wherein:
the supporting means includes a substantially arch-shaped supporting unit disposed on a supporting base; and
each vibrating means has a first end supported by the substantially arch-shaped supporting unit, and a second end supported by the supporting base.

26. The generator of claim 23, wherein:
the supporting means includes a vertical supporting unit disposed on a supporting base; and
each vibrating means has a first end supported by the vertical supporting unit, and a second end supported by the supporting base.

27. The generator of claim 23, wherein:
the supporting means includes multiple frames disposed on different planes; and
each frame has at least one membrane attached thereto.

28. The generator of claim 23, wherein:
the supporting structure includes two substantially parallel supporting units; and
at least one of the membrane units includes a membrane loop suspended between the supporting units.

29. The generator of claim 23, wherein at least one of the vibrating means aeroelastically flutters when subject to the fluid flow.

* * * * *